Feb. 3, 1948.   G. A. SPENCER   2,435,467
SPLICING MONOFILAMENT FABRICS
Filed Dec. 11, 1946
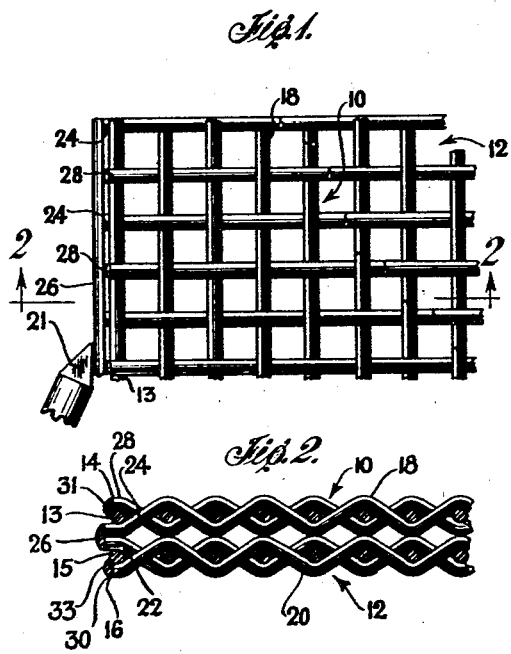
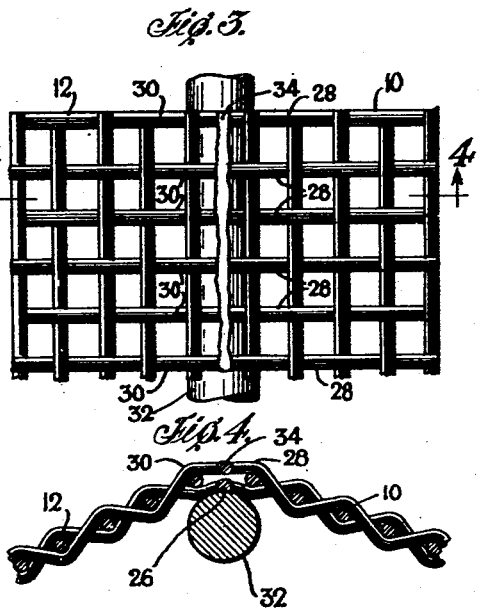
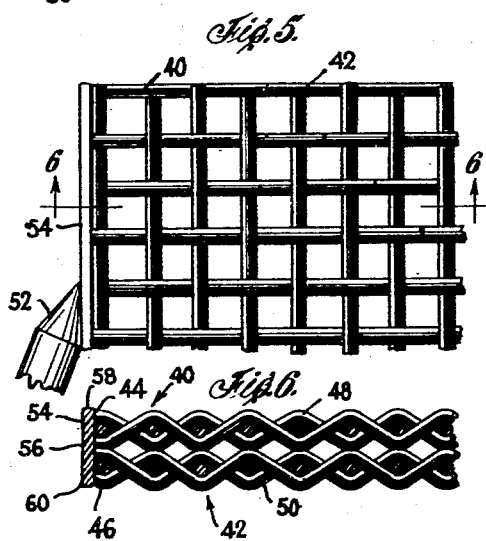
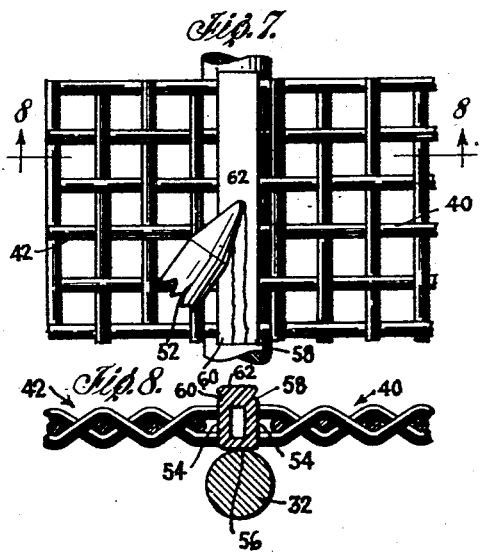
INVENTOR
GEORGE A. SPENCER
BY
ATTORNEYS Patented Feb. 3, 1948

2,435,467

UNITED STATES PATENT OFFICE 2,435,467

SPLICING MONOFILAMENT FABRICS

George A. Spencer, Akron, Ohio, assignor to The Firestone Tire & Rubber Company, Akron, Ohio, a corporation of Ohio Application December 11, 1946, Serial No. 715,407

7 Claims. (Cl. 154—116)

This invention relates to the production of seams or splices between portions of thermoplastic monofilament fabrics.

Within the last few years there have been developed fabrics made from wire-like rods or monofilaments varying in diameter from about .004" to about .02", made from thermoplastic materials such as vinylidene chloride polymers and copolymers, nylon, vinyl chloride resins, cellulose plastics and the like. Hereinafter such fabrics will be designated "monofilament fabrics." By reason of their smoothness, strength, wear resistance and attractive appearance, such fabrics have found wide acceptance for upholstery, tapestry, surface coverings on shoes, luggage, etc. Considerable difficulty has been encountered, however, in working up these fabrics into the desired articles by reason of the difficulty in forming seams between pieces of the fabrics. Sewing has been found unsatisfactory due to the unraveling tendencies of these fabrics and also to the unsightly appearance of sewn seams in these materials. Likewise, the use of adhesives is unsatisfactory in many cases, since only lap joints can be made by this means. Conceivably, heat-sealed lap-joints might be formed, but would be rather unsightly, since the lapped areas would necessarily be crushed down by the seaming operation. It was also early conceived by the present applicant that butt joints could be made by heat sealing the edges of monofilament fabrics together. However, such butt joints cannot be formed by any ordinary means, since it is necessary to simultaneously heat the surfaces to be joined and also to press the same together.

Accordingly, it is an object of this invention to provide strong and inconspicuous seams or splices between thermoplastic monofilament fabrics.

Another object is to provide such seams by the use of cheap and simple methods and apparatus.

A further object is to provide a heat sealed butt joint between thermoplastic monofilament fabrics.

The foregoing and other objects are secured in accordance with this invention in a process and resultant product illustrated in the accompanying drawing wherein:

Fig. 1 is a plan view, greatly enlarged, of a pair of monofilament fabrics in the first stage of being spliced together by the process of this invention.

Fig. 2 is a section along the line 2—2 of Fig. 1.

Fig. 3 is a plan view, greatly enlarged, of the fabrics of Fig. 1, in the second stage of the process of this invention.

Fig. 4 is a section along the line 4—4 of Fig. 3.

Fig. 5 is a plan view, greatly enlarged, of a pair of monofilament fabrics in the first stage of being spliced together by an alternative process according to this invention.

Fig. 6 is a section on the line 6—6 of Fig. 5.

Fig. 7 is a plan view, greatly enlarged, of the monofilaments of Fig. 5 in the second stage of the process of this invention, and Fig. 8 is a section on the line 8—8 of Fig. 7.

Referring first to Figs. 1 and 2, there are shown two pieces of monofilament fabric 10 and 12 which are to be joined together at their respective edges 14 and 16. The fabrics 10 and 12 are of plain weave pattern, 45 ends per inch in both warp and filling, the individual monofilaments being .008" in diameter and composed of an oriented crystalline copolymer of 95% vinylidene chloride and 5% vinyl chloride ("Saran 115," manufactured by The Dow Chemical Company). In the modification at present under description, the fabrics 10 and 12 are trimmed at their edges 14 and 16 along lines parallel to, and immediately adjacent, the continuous monofilaments 13 and 15 respectively, so that those monofilaments 22, 24, 28, 30 at right angles to the monofilaments 13 and 15 are cut off near the upper and lower faces of the fabrics.

The pieces of fabric 10 and 12 are first superposed as shown in Figs. 1 and 2 with their edges 14 and 16 coincident and with at least the immediately adjacent portions 18 and 20 of the fabrics 10 and 12 extending in contact, parallel to each other, and both in the same direction (in Fig. 1, to the right) away from the juxtaposed edges 14 and 16. With the fabrics in this position, it will be seen that, at the edges 14 and 16, certain monofilaments 22, 24 terminate at the mutually contacting faces of the fabrics 10 and 12, while other monofilaments 28, 30 terminate at the faces of the fabrics remote from the contacting faces. A sealing tool 21 heated to 320° F. is then drawn along the juxtaposed edges 14 and 16 to heat and weld together at least the filaments 22 and 24 on the contacting faces of the fabric 10 and 12, thus forming a welded bead 26. So far as is possible, the action of the heated sealing tool is confined to the filaments 22 and 24 so that the welded bead 26 will be confined to the zone of the filaments 22 and 24. However, no particular harm will ensue if the bead 26 is smeared out over the edges of the juxtaposed fabrics as illustrated in Fig. 5, to be described later. Also, the ends of the filaments 28 and 30 may optionally be fused into beads 31, 33 as seen in Fig. 2.

Upon completion of the bead 26, the fabrics are opened up book-wise as shown in Fig. 4, using the bead 26 as a hinge so as to bring the filaments 28 and 30 into an abutting relationship. The seam is then pressed upon a suitable supporting mandrel 32 and the heat sealing tool 21 is run along the line of contact of the filaments 30 and 28 to form another welded bead 34. The resultant seam between the fabrics 10, 12 is strong and flexible and, particularly on the side of the fabrics adjacent to the welded bead 26, inconspicuous.

Referring next to Figs. 5 and 6, there are shown two pieces of monofilament fabric 40 and 42, similar in composition to the fabrics 10 and 12, which are to be spliced together at their edges 44, 46. In accordance with the modification which is about to be described, no particular pains are taken to insure the termination of the monofilaments near the faces of the fabric as was the case with the monofilaments 22, 24, etc., of Fig. 1.

The pieces of fabric 40 and 42 are first superposed as shown in Figs. 5 and 6, with their edges 44 and 46 coincident and with at least the immediately adjacent portions 48 and 50 of the fabrics extending in contact, parallel to each other, and both in the same direction (to the right of Fig. 5) away from the juxtaposed edges 44, 46. A sealing tool 52, heated to 320° F., is run along the edges 44, 46 to fuse the monofilaments and smear them into the form of a flat bead 54 joining the filaments and extending across the edges 44, 46. Upon completion of the bead 54, the fabrics 40, 42 are opened up bookwise as shown in Figs. 7 and 8, using the central portion 56 of the bead 54 as a hinge, so as to bring the edges 58, 60 of the bead 54 into abutting relationship. The heated sealing tool 52 is then run along the abutted edges 58, 60 to fuse the same together as indicated at 62. The resultant seam between the fabrics 40, 42 is strong, flexible and, on the side of the spliced fabrics away from the fused edges 58, 60, 62, inconspicuous.

As stated above, fabrics made from a wide variety of monofilaments may be spliced together in accordance with this invention, the principal criterion being that the materials of which the monofilaments are made shall be sufficiently thermoplastic so that monofilaments thereof will "heat seal," i. e., will adhere to one another when heated and pressed together. Suitable monofilaments will thus be seen to include, for instance, the oriented-crystalline monofilaments produced from polymers of vinylidene chloride and copolymers thereof with minor proportions of other unsaturated compounds copolymerizable therewith such as vinyl chloride, vinyl acetate, vinyl ethers, styrene, acrylic esters and nitriles, etc., examples of commercial products of this type being "Velon" or "Saran," products respectively of The Firestone Tire & Rubber Company and of The Dow Chemical Company. Another important class of thermoplastic monofilaments, fabrics of which may be spliced in accordance with this invention, are the nylon monofilaments, which are oriented-crystalline high molecular polyamides such as condensation products of hexamethylene diamine with adipic acid, or condensates of ω-amino caproic acid, etc. Other monofilaments suitable for use in this invention include those comprising polymers of vinyl chloride and copolymers thereof with minor proportions of other unsaturated compounds copolymerizable therewith, such as vinyl acetate, vinylidene chloride, acrylic esters and nitriles, styrene, vinyl ethers and the like, an example of this type of fiber being marketed under the name of "Vinyon" by the Carbide and Carbon Chemical Corporation; or cellulose derivatives such as cellulose acetate, ethyl cellulose, benzyl cellulose, etc. By the term "monofilament" it is also intended to include conventional textile threads which have been impregnated and coated with thermoplastic compositions so as to provide a substantially solid monofilament of plastic composition reinforced by the fine filaments of the textile thread, an example of such a product being "Textron," a plastic-coated thread manufactured by the Freydberg Brothers-Strauss, Inc.

The invention has been described largely in connection with the use of heated sealing tools 21 or 52. In place of the heated sealing tool 21, there may, of course, be employed any other implement capable of locally heating the fabric to effect the welds 26, 54, etc., examples of such implements being heated gaseous jets, high-frequency electrodes, and the like.

From the foregoing description, it will be seen that this invention provides novel means for joining the edges of thermoplastic monofilament fabrics, resulting in inconspicuous seams. It will also be seen that the method requires the use of only the simplest tools, and that the method may be carried out without the exercise of extreme care or skill.

What is claimed is:

1. The method of splicing together pieces of thermoplastic monofilament fabric which comprises superposing the pieces of fabric with the edges thereof to be joined in alignment, and with at least the portions of both fabrics adjacent to the edges to be joined extended in contact, parallel to each other, and in the same direction away from the edges to be joined, heat sealing together the adjacent filaments of the fabrics at the edges to be joined, opening out the fabrics about the hinge so formed between the pieces of fabric, and welding together the filaments at said edges remote from said hinge.

2. The method of splicing together pieces of vinylidene chloride monofilament fabric which comprises superposing the pieces of fabric with the edges thereof to be joined at alignment, and with at least the portions of both fabrics adjacent to the edges to be joined extended in contact, parallel to each other and in the same direction away from the edges to be joined, heat sealing together the adjacent filaments of the fabrics at the edges to be joined, opening out the fabrics about the hinge so formed between the pieces of fabric, and welding together the filaments at said edges remote from said hinge.

3. The method of producing a heat sealed butt joint between pieces of thermoplastic monofilament fabric which comprises superposing the fabric with the edges thereof to be joined in alignment and with at least the portions of both fabrics adjacent to the edges to be joined extended parallel to each other and in the same direction away from the edges to be joined, fusing the mono-filaments at the edges of the fabrics to be joined, smearing the fused monofilaments out into the form of a flat bead bridging over and autogenously joining the monofilaments, opening out the fabrics about the hinge so formed between the fabrics, and welding together the flat bead at its edges remote from said hinge.

4. The method of heat sealing a butt joint between pieces of vinylidene chloride monofilament fabric which comprises superposing the fabric with the edges thereof to be joined in alignment and with at least the portions of both fabrics adjacent to the edges to be joined extended parallel to each other and in the same direction away from the edges to be joined, fusing the monofilaments at the edges of the fabrics to be joined, smearing the fused monofilaments out into the form of a flat bead bridging over and autogenously joining the monofilaments, opening out the fabrics about the hinge so formed between the fabrics, and welding the flat bead at its edges remote from said hinge.

5. A joint between thermoplastic monofilament fabrics wherein the filaments on one face of the fabrics are joined to each other by heat sealing materials.

6. A joint between thermoplastic monofilament fabrics, wherein the filaments on one face of the fabrics are joined together by means of a welded bead autogenously fused from, and integral with, the filaments at the joined edges of the fabrics.

7. A joint between thermoplastic monofilament fabrics, wherein the monofilaments at the edges of the pieces of fabric joined together are bridged over by a welded bead autogenously fused from, and integral with, the filaments at the joined edges of the fabrics, said bead being smeared entirely across the joined edges of the fabric, folded upon itself to bring the edges of the bead together, and fused together at the edges of the bead.

GEORGE A. SPENCER.

REFERENCES CITED

The following references are of record in the file of this patent:

UNITED STATES PATENTS

| Number | Name | Date |
|---|---|---|
| 1,784,216 | Aldrich | Dec. 9, 1930 |
| 2,220,545 | Reinhardt | Nov. 5, 1940 |
| 2,281,976 | Hansen | May 5, 1942 |
| 2,407,495 | High | Sept. 10, 1946 |